US005864675A

United States Patent [19]
Booth, Jr. et al.

[11] Patent Number: 5,864,675
[45] Date of Patent: Jan. 26, 1999

[54] DATA CAPTURE SYSTEM ERASES ALL INFORMATION STORED IN FLASH MEMORY IF AVAILABLE STORAGE IN THE FLASH MEMORY IS LESS THAN THE MAXIMUM SEGMENT SIZE

[76] Inventors: John S. Booth, Jr., 11117 Trappers Creek Dr., Raleigh, N.C. 27614; Andrew C. Edwards, 5610 Azure Way, Long Beach, Calif. 90804; William C. Stewart, 7616 Elliott Dr., Raleigh, N.C. 27613; Brian R. Taraci, 71 Toulon Ave., Foothill Ranch, Calif. 92708

[21] Appl. No.: 616,642

[22] Filed: Mar. 15, 1996

[51] Int. Cl.⁶ .................................................. G06F 13/00
[52] U.S. Cl. .................... 395/200.54; 395/838; 395/872; 395/877; 365/185.29; 711/106
[58] Field of Search ....................... 395/117, 309, 395/800, 183.01, 838, 872, 877, 200.54, 200.59; 365/218, 185.29; 364/400; 380/25; 711/106, 217; 707/10; 705/3, 2

[56] References Cited

U.S. PATENT DOCUMENTS

| | | | |
|---|---|---|---|
| 4,315,309 | 2/1982 | Coli | 705/3 |
| 4,800,524 | 1/1989 | Roesgen | 711/217 |
| 4,893,270 | 1/1990 | Beck et al. | 364/400 |
| 5,088,051 | 2/1992 | Forsythe et al. | 395/117 |
| 5,437,024 | 7/1995 | French | 707/10 |
| 5,473,569 | 12/1995 | Chwu | 365/218 |
| 5,579,393 | 11/1996 | Conner et al. | 380/25 |
| 5,630,048 | 5/1997 | La Joie et al. | 395/183.01 |
| 5,644,778 | 7/1997 | Burks et al. | 705/2 |
| 5,649,129 | 7/1997 | Kowert | 395/309 |
| 5,651,114 | 7/1997 | Davidson, Jr. | 395/200.59 |

*Primary Examiner*—Le Hien Luu
*Attorney, Agent, or Firm*—Mills Law Firm Pllc

[57] ABSTRACT

A system and method for capturing data communicated between a computer system and a printer. The data capture system monitors data communicated between the computer system and printer, acquires pertinent portions of the data, and stores the acquired data for later use. This system and method may be used to acquire patient encounter data, including demographic and insurance data, entered into a medical provider's computer office management system when the patient visits the medical provider. Often, the medical provider will print patient encounter data at a printer connected to the office management system. The data capture system acquires and stores pertinent portions of the patient encounter data, such as the demographic data, communicated from the medical provider's office management system to the printer. The acquired patient demographic data stored in the data capture system is later transferred to a commercial laboratory that performs tests on patient specimens taken from a patient visiting the medical provider. The commercial laboratory uses the patient demographic data to properly process the patient specimens and bill the patient's insurance company.

10 Claims, 7 Drawing Sheets

DATA CAPTURE SYSTEM ERASES ALL INFORMATION STORED IN FLASH MEMORY IF AVAILABLE STORAGE IN THE FLASH MEMORY IS LESS THAN THE MAXIMUM SEGMENT SIZE

FIELD OF THE PRESENT INVENTION

The present invention is directed toward a system and method for capturing and storing data being communicated between a computer and an external device, and more particularly to a system for capturing patient data from a medical provider's office management system for use by a commercial laboratory when processing patient specimens.

BACKGROUND OF THE INVENTION

Commercial laboratories perform tests on organic specimens obtained from a patient by a physician, clinic, or a hospital (hereinafter referred to as "medical provider"). The commercial laboratory can often perform the tests more efficiently than the physician due to various economies of scale. Commercial laboratories may maintain high speed, highly-automated testing equipment that would be prohibitively expensive for most medical providers. The tests performed range from routine blood chemistry through more complicated DNA procedures on specimens. Typically, the commercial laboratory will arrange for the transportation of the specimens to the laboratory, perform tests thereon, and return the results to the medical provider. The medical provider usually receives the test results within twenty-four to forty-eight hours, depending, of course, on the complexity of the test.

Commercial laboratories often maintain a relationship with medical providers through a clinical laboratory representative. Typically, the representative manages situations that may arise and provides support to medical providers to facilitate their relationship with the commercial lab. The representative may provide computer equipment, phone lines, printers, and training. However, the commercial laboratory may need to make sure that any materials provided are not used for purposes unrelated to the gathering of specimens. In many cases, the commercial laboratory would violate various laws or regulations if the commercial laboratory provided financial incentives to induce a medical provider to direct patient specimens to its commercial laboratory. Therefore, the commercial laboratory often has to avoid providing equipment that could benefit the medical provider in matters unrelated to its business with the commercial laboratory.

Numerous laws and regulations govern how commercial laboratories may be reimbursed. In the "account bill" method, the medical provider pays the commercial laboratory and collects the payment from the patient. The medical provider may charge the patient more than the laboratory bills the medical provider, thereby realizing a profit from the transaction. Often, insurance billing methods, including Medicare and Medicaid, however, eliminate the medical provider from the billing procedure. Some laws may require that the commercial laboratory directly bill the insurance provider. The purpose of these laws is to reduce a medical provider's incentive to order unnecessary tests.

One unintended effect of these restrictions is that commercial laboratories often encounter difficulties obtaining patient billing information from medical providers. Each time a patient visits the medical provider, the medical provider updates the patient demographic data, including address, age, name, employment, and the patient insurance data. This updated demographic is part of the patient encounter data obtained from the patient when visiting the medical provider. The commercial laboratories need the demographic data to properly process the specimens and bill the patient's insurance provider.

Currently, many commercial laboratories obtain patient data on 8½×11 forms known as "requisitions." The requisition form is typically divided into three sections. The first section may contain patient demographic data, such as date, time, name, sex, date of birth, identification number, and address. The second section may contain insurance billing formation. The third section likely includes the tests to be performed on the specimen. However, medical providers are often unwilling to commit resources to update the patient demographic data for the commercial laboratories when the medical providers receive no compensation for their effort. This reluctance on the part of the medical providers makes it difficult for the commercial laboratories to effectively bill the patient's insurance provider.

Often, the commercial laboratories have couriers who retrieve the patient specimen and associated requisition forms from the medical provider on a daily basis. In many cases, the specimens are sent to a branch facility where they are labeled. Employees at the branch facility may then enter the patient data from the requisition form into the commercial laboratory's computer system and then transfer the specimens to the central laboratory. The central laboratory then accesses the data entered in its computer system when processing the specimens. Absent quality control procedures for data entry, errors may result.

In prior art systems, the medical provider might have communication equipment to receive the test results from the commercial laboratory. The communication equipment would often be a teleprinter or other similar device having preprinted forms coupled to a custom modem. The commercial laboratory would transmit test results to the medical provider's office and the teleprinter would then print the results. As an alternative, the medical provider may have a personal computer, including a modem and software, which the medical provider uses to obtain test results from the commercial laboratory's computer via a modem.

As an alternative, it is also possible to couple the commercial laboratory and the medical provider's computer systems. The commercial laboratory typically has a mainframe or network computer system. The medical provider would generate the pertinent data for a specimen, then transmit that data to the commercial laboratory's computer system via a modem. The medical provider could then use its computer to obtain any test results from the commercial laboratory's system via a modem.

One particular problem in this alternative is developing a suitable interface to couple the medical provider's Office Management System ("OMS") and the commercial laboratory's system. Many OMS systems are proprietary or UNIX based and the developer of the OMS system is often unwilling to develop a suitable interface for commercial laboratories. Another problem is the additional hardware that may be needed to support a network interface between the commercial laboratory and the medical provider's OMS. Such an interface may require additional ports and hardware enhancements, including additional memory and disk drives. The medical provider may be unwilling to pay for such hardware. Furthermore, in some cases, in order to add a node to the OMS network the commercial laboratory may have to add eight ports just to obtain one interface to the OMS system.

Providing additional hardware that the medical provider could use for its own benefit unrelated to operations concerning the commercial laboratory may be considered an illegal inducement. Furthermore, the commercial laboratories are often required by law to maintain ownership of all equipment the provide to the medical provider. Ownership may create problems if the commercial laboratory provides hardware upgrades and memory to the medical provider's system. The commercial laboratory would likely have to remove such upgrades from the medical provider's system if the medical provider subsequently changed commercial laboratories. Consequently, in many cases, requisition forms including patient demographic information are usually retrieved by courier and taken to a branch facility wherein the requisition data is entered into the commercial laboratory's computer system.

SUMMARY OF THE INVENTION

It is an object of the present invention to provide an improved system for acquiring specified information from a computer system, particularly, in a manner requiring a relatively uncomplicated electronic arrangement.

It is a further object of the present invention to provide an improved system for acquiring patient demographic data from a medical provider's office management system, wherein the acquired data is later transferred to a commercial laboratory along with patient specimen. The present invention allows the commercial laboratory to obtain updated patient insurance data for billing purposes without having to rely on the medical provider to separately enter the patient demographic data, provide an interface between the commercial laboratory's computer system and the medical provider's system.

Another object is to provide a data capture system that a commercial laboratory could install at a medical provider's office, wherein the medical provider could not use the data capture system for purposes other than its relationship with the commercial laboratory.

A still further object is to provide a data capture system that a commercial laboratory could easily retrieve from the medical provider should the medical provider select another commercial laboratory to process patient specimens.

Yet another object of the invention is to provide a data capture system which recognizes gaps between data records based on unique timing characteristics in a stream of data including a plurality of data records and divides the stream along record boundaries for subsequent processing.

An additional object of the invention is to provide a data capture system having an inexpensive non-volatile memory system employing a novel memory system for optimizing performance and cost.

These and other objects and advantages are achieved in a data capture system which, in accordance with the illustrated embodiment, monitors data as the data is being transmitted from a computer system to an external device, acquires pertinent parts of the transmitted data, and stores the acquired data in memory for later use. The invention thus permits the acquisition of specified data stored in a computer system without having to integrate with that computer system and without having to provide a complicated interface or upgrades to that computer system.

The details of different embodiments of the present invention are set forth below. Once the details of the invention are known, numerous additional innovations and changes will become obvious to one skilled in the art.

DETAILED DESCRIPTION OF THE PREFERRED EMBODIMENTS

Figure 1A:
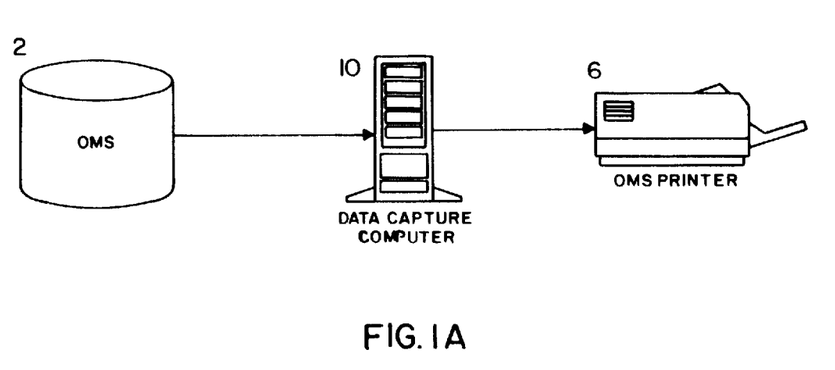
FIGS. 1A and 1B are pictorial diagrams of data capture systems for acquiring data as the data is transmitted from a computer system to an external source.
Figure 1B:
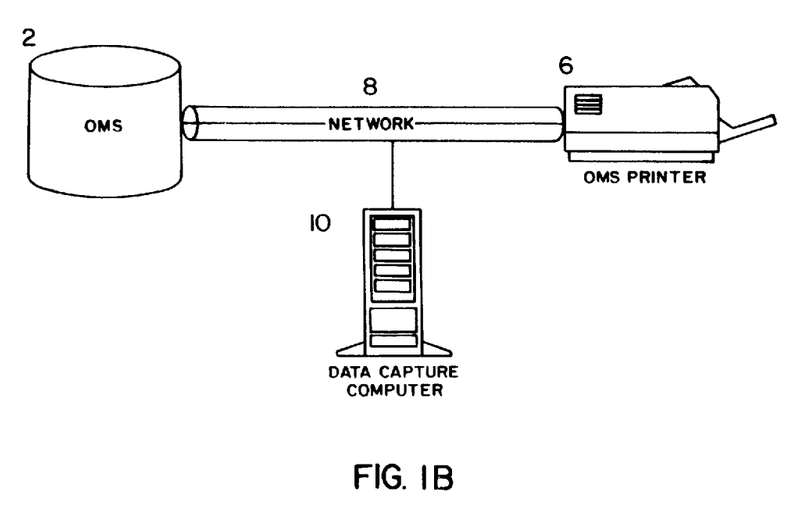

In FIGS. 1A and 1B there are illustrated pictorial diagrams of a data capture system 10 in accordance with preferred embodiments of the present invention. The data capture computer 10 is located at the medical provider's facility and monitors data being sent from the medical provider's OMS system 2 or computer system to an external device such as a printer 6 coupled to the OMS system 2. The OMS printer 6 may be a laser printer, dot matrix printer, ink-jet printer or any other printer known in the art. It should also be appreciated that the data capture computer 10 may monitor data transferred, via a standard interface, to devices other than a printer, such as another computer, storage unit, display, or any other device capable of receiving data from a computer. The data capture computer 10 is programmed to recognize when the data communicated between the OMS system 2 and the OMS printer 6 is in a specified format such as PCL-5. If the transmitted data is in the specified format, then the data capture computer 10 captures the pertinent data, such as patient demographic data, and stores the captured data in memory. The capture of data by the data capture computer 10 does not interfere with data communication between the OMS system 2 and the OMS printer 6.

The data capture computer 10 may be a general purpose computer including software that allows the data capture computer 10 to operate in data capture mode. Alternatively, the data capture computer 10 may be a special purpose hardware device dedicated to data capture operations, including a processor, memory, and control logic. FIGS. 1A and 1B show two embodiments of how the data capture computer 10 may interface with the OMS system 2 and OMS printer 6 and monitor data transmissions therebetween. Referring to FIG. 1A, the OMS system 2 is linked by a cable to the data capture computer 10 to the OMS printer 6 via a parallel interface. In this particular embodiment, data transmissions between the OMS system 2 and the OMS printer 6 pass through the data capture computer 10 by a bus link between two parallel ports, one coupled to the printer and one coupled to the OMS system 2 wherein the data may be monitored. Alternatively, the data capture computer 10 interface ports may be serial or any other suitable interface format known in the art. Preferably, if the data capture computer is turned off, the data for the printer is still provided as the bus link still exists between the ports through the use of tristate logic drives coupling the bus connecting the two parallel ports.

Referring to FIG. 1B, the data capture computer 10 could alternatively interface with the OMS system 2 and OMS printer 6 via a common network adapter 8. In this particular embodiment, the data capture computer is programmed to monitor OMS system 2 data transmissions to the OMS printer 6 via the network 8. When the data capture computer 10 recognizes that data being sent from the OMS system 2 to the OMS printer 6 is in the specified format, the data capture computer 10 will acquire the pertinent data and store that data for later use.

At the start of the patient visit, the OMS system 2 generates the patient encounter form and the data capture computer 10 captures the current demographic data for that patient while the form containing the data is being printed. If during the patient visit, the medical provider obtains a patient specimen, the medical provider needs to prepare a requisition order indicating the tests to be performed on the specimen. The medical provider may enter the requisition data for the tests at the data capture computer 10. The data capture computer 10 may generate a specimen identification number. A bar code label containing the specimen identification number may be printed and attached to the specimen container. The medical provider may access the already captured demographic data and add the needed requisition data for the specified tests. All of the data associated with the labeled specimen, including the patient demographic data, the bar code number, and the desired tests, may be transported on a portable storage medium along with the labeled specimen to the commercial laboratory. The commercial laboratory will then retrieve the labeled patient specimen and the portable storage medium containing the requisition and demographic data. The commercial laboratory processes the specimens in accordance with the retrieved data and may use the demographic data to properly bill the patient's insurance provider.

Figure 2:
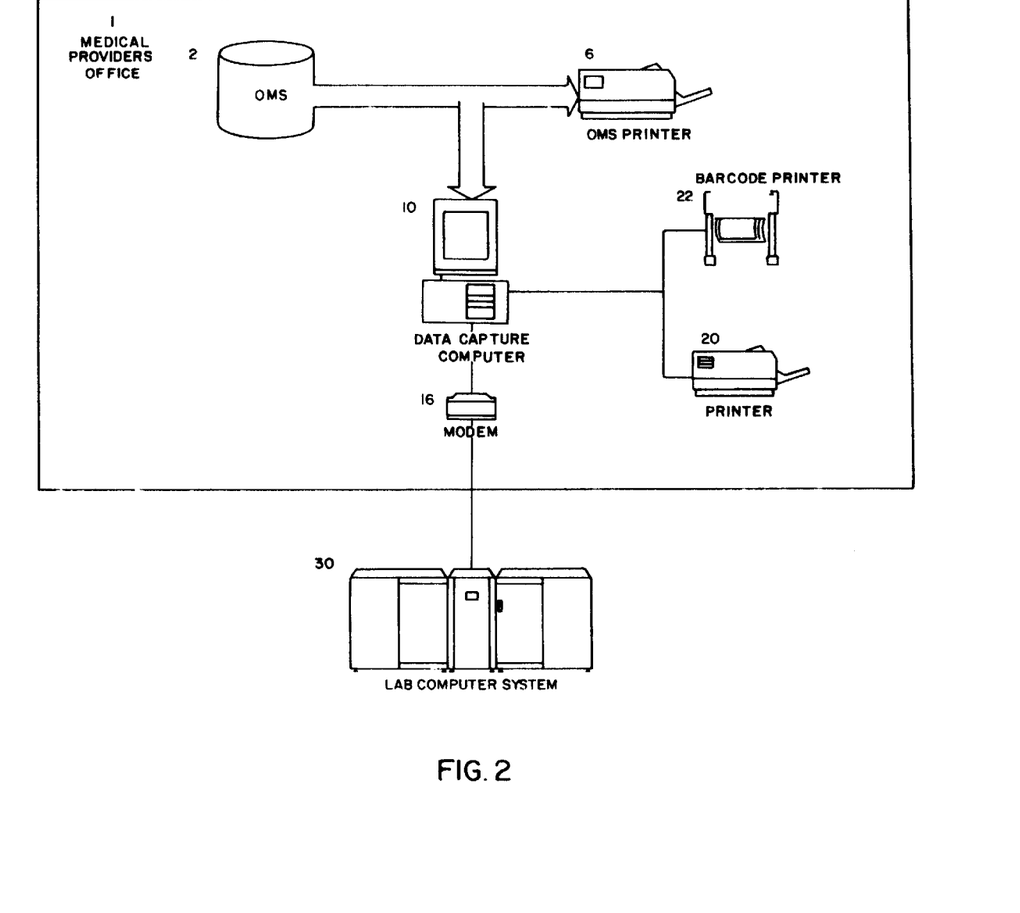
FIG. 2 is a pictorial diagram illustrating how the data capture system may be used in a medical provider's office with additional equipment.

FIG. 2 is a pictorial diagram of how the data capture computer 10 may be integrated into a medical provider's office 1 with additional equipment to process patient specimens and data associated with those specimens. Referring to FIG. 2, the medical provider's office 1 includes the OMS system 2 which includes a database of patient records. The commercial laboratory has a computer system 30 for processing data from the medical provider's office 1 and transmitting laboratory results thereto. The laboratory computer system 30 may be any computer system capable of managing data, including a mainframe, network server system or any other suitable computer system known in the art.

Referring to FIG. 2, the data capture computer 10 may be coupled to the OMS system 2 as previously described above. The data capture computer 10 may include data entry capabilities thereby allowing the medical provider to enter, store, revise, print or otherwise manipulate captured data or add requisition data indicating the tests to be performed on the patient specimens. The data capture computer 10 may be a personal computer, including an operating system such as Microsoft Windows™, DOS™, O/S2™, or any other suitable operating system compatible with the OMS system 2. The data capture computer 10 may be further be coupled to a pen-based touch screen, voice entry system, or any other data entry device known in the art providing further data entry capability. In the preferred embodiment shown in FIG. 2, the data capture computer 10 is a personal computer including sufficient microprocessor and memory capability to perform all functions attributed to the data capture computer 10 described herein.

Further included in the medical provider office 1, is a bar code printer 22 and printer 20, both of which may be coupled to the data capture computer 10. The bar code printer 22 generates bar code labels that may be attached to the specimen container. Data stored in the data capture computer 10 may be printed at the printer 20.

The data capture computer 10 may be coupled to a modem 16 and have the capability to receive test results from the commercial laboratory. After the commercial laboratory processes the specimens, the laboratory computer system 30 communicates the results to the data capture computer 10 via the modem 16. The data capture computer 10 may be programmed to store the test results received from the commercial laboratory in memory and print a report of the laboratory results at the printer 20. It should also be appreciated that the modem 16 may be any suitable transmission means known in the art for allowing communication between the commercial laboratory system 30 and the data capture computer 10, including a cellular telecommunication link.

The data capture computer 10 may include a PCMCIA expansion slot. The data capture computer 10 may transfer data, such as the captured patient demographic data and the entered requisition data indicating the tests to be performed, to a PCMCIA card inserted in the PCMCIA expansion slot of the data capture computer 10.

The data capture computer 10 may communicate captured patient demographic data and the requisition data indicating the tests to be performed on the specimens to a PCMCIA card inserted in the PCMCIA expansion slot. It should be appreciated that alternative storage medium could be used. For instance, the captured data and requisition data may be stored on magnetic disks, tapes, or any other suitable storage medium known in the art. Furthermore, as an alternative, the data capture computer 10 may transfer data to a printer instead of a PCMCIA expansion slot or other suitable storage device.

In addition, the captured demographic data and requisition data stored in the data capture computer 10 could alternatively be communicated to the laboratory computer system 30 via a modem and telephone line or other suitable transmission means. Other embodiments and combinations of computers and printers are also possible, their specific design depending upon the particular system configuration at the medical provider office.

The system shown in FIG. 2 may be used to process laboratory specimens and patient data related to such specimens in the following manner. When the patient visits the medical provider, an encounter form containing updated patient demographic data is prepared. The encounter data is then entered into the OMS system 2 via an entry device coupled to the OMS system 2. Thereafter, the OMS system 2 transmits the encounter data to the OMS printer 6. The data capture computer 10 is programmed to capture and store pertinent portions of encounter data, such as the demographic data, communicated from the OMS system 2 to the OMS printer 6.

To order tests on the patient specimen, the medical provider enters requisition data at the data capture computer 10. The medical provider then generates and prints a bar code label on the bar code printer 22 and affixes the label to the specimen container. The bar code label is used to identify the specimen during transportation and processing. It should be appreciated that any label could be used to identify the specimen, including adhesive labels which may be generated at a printer interfaced with the data capture computer 10. A printout of the requisition data may be generated on the printer 20 for the medical provider's records. At some point during the day, the requisition data entered at the data capture computer 10 and the demographic data stored in the data capture computer 10 are communicated to a PCMCIA card inserted in the PCMCIA expansion slot of the data capture computer 10. A courier for the commercial laboratory will then pick up the labeled patient specimens and the PCMCIA card containing the demographic and requisition data associated with the specimens and transfer the specimens and PCMCIA card to a branch office of the commercial lab.

The branch office may then print a manifest of the requisition data stored on the PCMCIA card, verify the specimens, and transmit the requisition data and patient demographic data to the commercial laboratory's computer system 30. The branch office would then transfer the specimens to the commercial lab. The commercial laboratory processes the specimens according to the requisition order. The commercial laboratory may then enter the results in its laboratory computer system 30 and communicate the results therefrom to the medical provider's data capture computer 10 via the modem 16. The commercial laboratory then processes the demographic data in order to properly bill the patient's medical insurance provider.

The data capture system of the preferred embodiment provides a solution to the problem of obtaining desired information from the medical provider's OMS system 2 without having to provide a complicated non-standard interface to the OMS system 2 With the present embodiment, the commercial laboratory only has to provide the data capture computer 10 to obtain information needed from the medical provider's OMS system 2. The commercial laboratory does not have to provide complicated interfaces or expensive upgrades to the physician's OMS system 2 to acquire the pertinent demographic data. Nor does the commercial laboratory have to rely on the medical provider to separately enter patient demographic data for the commercial laboratory's use. Furthermore, the commercial laboratory avoids illegally inducing the medical provider in two ways. First, the data capture computer 10 may be programmed only to perform operations related to the processing of data associated with the patient specimens and, thus, may not be used to otherwise benefit the medical provider. Second, the commercial laboratory can easily remove the data capture computer 10 from the medical provider's facility should the medical provider select another commercial laboratory to process its patient specimens.

Figure 3:
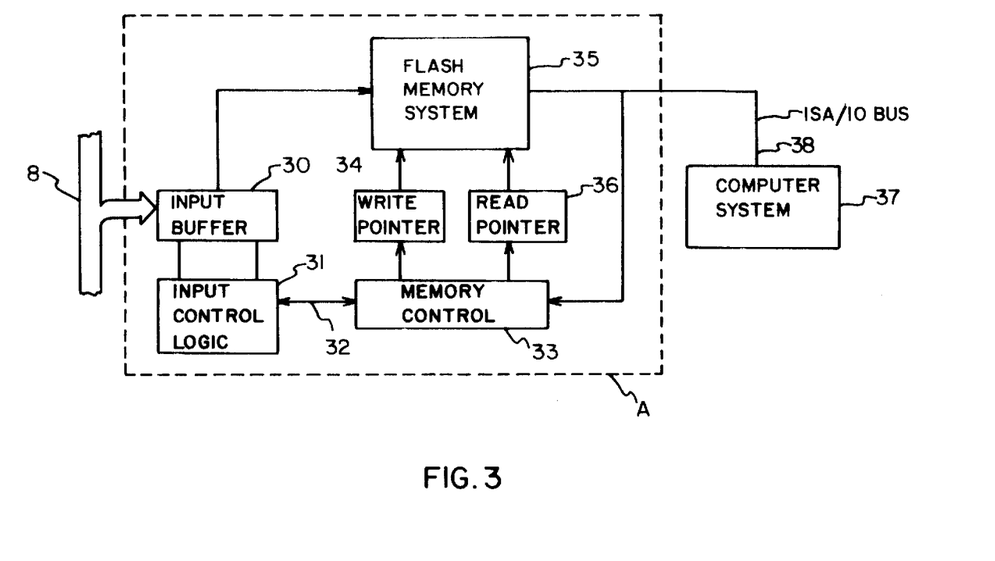
FIG. 3 is a schematic block diagram illustrating an input adapter card which includes a non-volatile memory according to the invention and its interconnection to a programmed computer system via the computer input/output bus.

In FIG. 3 the data stream from the OMS system 2 on network 8 is received in an input buffer 30 of an input adapter card A Input control logic 31 monitors the data stream for proper format an requests a write operation via cable 32 from a memory controller 33 when the input buffer contains a byte of relevant data Memory controller 33 maintains a write address pointer 34 and when requested via cable 32 causes the data in the input buffer 30 to be written into a flash memory system 35 at the address specified by the write address pointer. When the write operation is completed memory controller 33 increments the write pointer so that it points to the next sequential address in the flash memory 35.

Memory controller 33 also maintains a read address pointer 36. Initially, these two pointers are identical, indicating that the flash memory does not contain data to be transferred to the user program running in the programmed computer system 37 to which the input adapter card A is connected via the computer Input/Output bus 38.

Once data is stored in flash memory 35 write address pointer 34 is incremented and equality no longer exists between the pointers 34 and 36. At this time, memory controller 33 sends an updated status indicating received data in flash memory 35, via bus 38 to the application program running in computer 37.

When ready, the application program sends a read request to memory controller 33 via the bus 38. In response to this request memory controller 33 executes a read operation in the flash memory 35 at the address indicated by the read address pointer and places the data on the bus 38. After the read operation is completed the memory controller 33 increments the read address pointer. If this causes the two pointers to become equal the memory controller, under conditions to be described later, sends status to the application program indicating no data. As additional data is received, the status transmitted to the application program changes to indicate data available and additional read requests are received at the memory controller.

Flash memory 35 provides non-volatile storage at reasonable cost, however, it comes with certain disadvantages. The memory can not be overwritten. Like storage tube memories in the past, the entire memory must be erased before any previously used address can be rewritten with new data. In addition, and more importantly, the number of memory erasures before the memory becomes unreliable is limited. It is therefore important that premature memory erasure be held to an absolute minimum if economical operation is to be achieved.

In order to optimize memory use, the data being sent to the printer was analyzed to determine if a quantity could be reliably recognized which began and ended on record boundaries. It is incumbent that a block of data selected for processing begin and end on record boundaries, otherwise one or possibly two encounter records could be mutilated and rendered useless.

The data stream sent to the printer included gaps. It was determined that these gaps could represent record boundaries, however, they could also occur within a record when, for example, the printer buffer filled and the printer suspended data transfer for a limited time. Further study revealed that gaps introduced by the printers had a limited duration and gaps extending beyond that limited duration could be used to segment the data stream for processing on record boundaries.

The segments were studied and it was discovered that they could be reliably characterized as to maximum length. With this information a trip address was selected such that the largest possible segment could be stored in those available memory addresses above the trip address before an over run memory condition occurred.

As each byte is read from the flash memory a trip counter is incremented. At the end of each segment the trip counter is compared to the trip address. If the trip counter is equal to or greater than the previously selected trip address then the flash memory is erased, the write and read pointers are reset and the trip counter is also reset. The flash memory is erased at this time since the number of available storage address is less than the maximum possible segment size. Since the segment size is a small fraction of the flash memory capacity, this technique provides a very efficient utilization of the available memory life.

Figure 4:
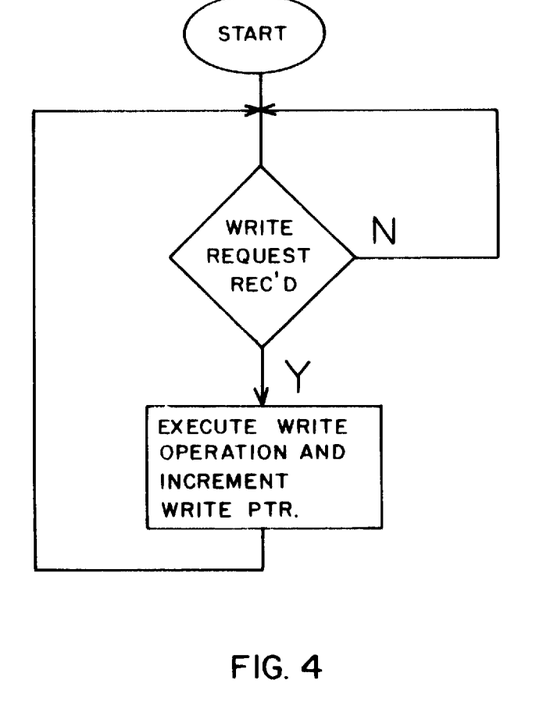
FIGS. 4, 5 and 6 are flow charts illustrating the operation of the memory controller on the input adapter.

The flow chart illustrated in FIG. 4 is executed in the memory controller 33. When a write request from input controller 31 is received, controller 33 stores the contents of the input buffer 30 in the flash memory system 35 address specified by the write pointer 34. After the write operation is completed memory controller 33 increments the write pointer 34 and a subsequently received byte can be stored in the next address now contained in the write pointer 34.

Figure 5:
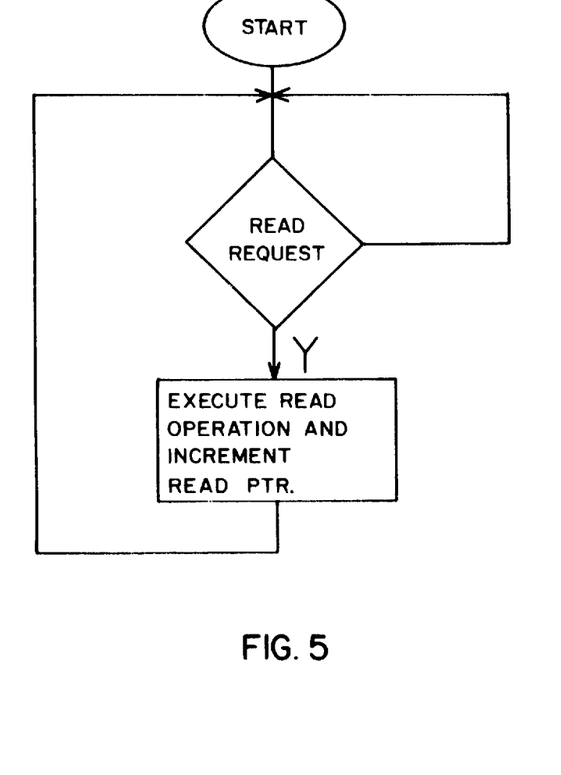

The flow chart illustrated in FIG. 5 is also executed in the memory controller 33. Each time a read request is received from the application program running in computer 37, the memory controller executes a read operation in memory 35 at the address specified by the read pointer 36. The data read is placed on the bus 38 and made available to the application program via the operating system in the computer 37.

After the data is read the read pointer 36 is incremented to point to the next address which may or may not contain data. If incrementing the read pointer causes it to equal the write pointer, then no additional data for the application program is stored in flash memory 35 and the status sent to the application program must be changed. If the write pointer is still greater than the read pointer then additional data for the application program is available at the address specified by the read pointer and the status previously sent to the application program is still valid.

Figure 6:
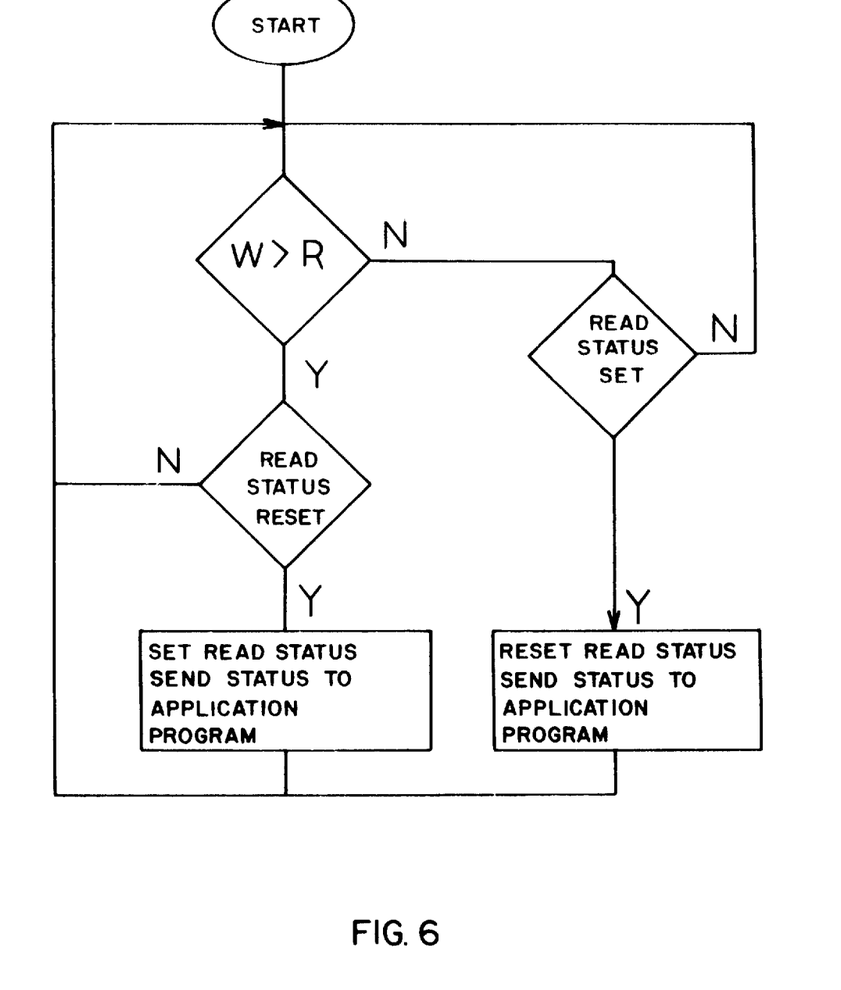

The flow chart illustrated in FIG. 6 is executed in the memory controller 33. This chart deals with the management of the memory status which the memory controller 33 sends to the application program. When the write address pointer W is greater than the read address pointer R, the memory read status is checked. If it is in the reset state, indicating no data present, it is set and sent to the application program which will start a read operation as described above. If it is already in the set state the program loops.

If the write address pointer is not greater than the read address pointer, the read memory status is checked. If the status is set (indicating data) it is reset to indicate no data and sent to the application program. If the status was not set the program loops.

Figure 7:
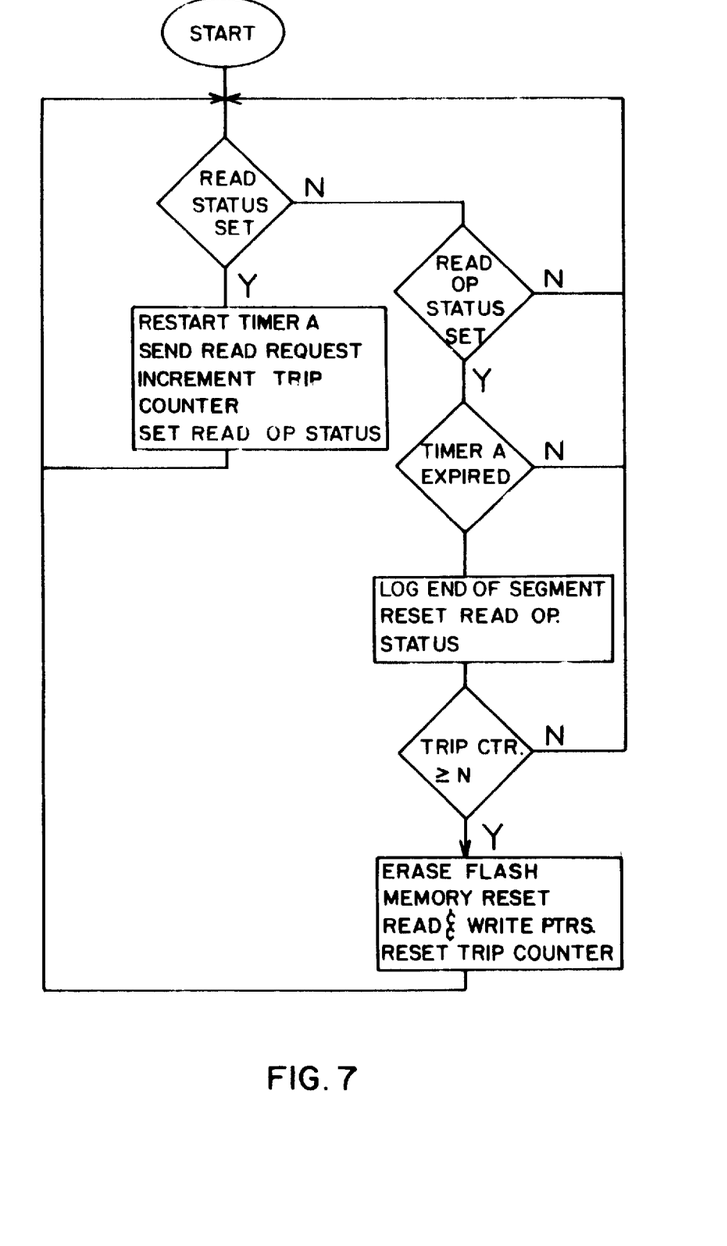
FIG. 7 is a flow chart illustrating the operation of the user application program running in the computer which receives the data captured in the non-volatile memory in the input adapter card.

The flow chart illustrated in FIG. 7 is executed in computer system 37 by the application program. The application monitors the memory read status set by the memory controller 33. If status is set the program starts or restarts a timer A, sends a memory read request to memory controller 33, increments a trip counter and sets or resets a read operation status indicator.

If the read memory status is not set, the program checks the read operation status. If is not set the program loops back to start. If it is set it checks timer A. If timer A has not expired the program loops back to start. If timer A has expired, the program resets the read operation status, logs an end of segment and initiates processing of the segment data described above.

It also compares the value of the trip counter to the trip address N. If the trip counter is less than the trip address N, the program loops back to start. If the trip counter value is equal to or greater than the trip address N, the program notifies the memory controller 33 to erase the flash memory and reset the write and read address pointers. The application program also resets the trip counter to correspond to the erasure of the flash memory and the resetting of the read address pointer.

While several embodiments of the invention have been shown and described in detail it will be obvious to those skilled in the art that changes may be made without departing from the spirit or scope of the invention as described.

What is claimed is:

1. A data capture system including a programmed computer, a bus and an adapter connected thereto for capturing data stored in another computer system when that system transmits data to a utilization device over a standard media interface comprising:

First adapter means for attaching the data capture system to the media and for selecting data on the media;

Second adapter means responsive to said first adapter means for storing the selected data in ordered addresses in a memory, for providing a status signal to a utilization means in said computer for indicating the availability of data in the said memory and for providing data stored in the said memory via said bus to said utilization means in said computer upon request;

Said utilization means comprising; means responsive to the status received from the second adapter means for requesting data when the status indicates data is available, for segmenting the received data for processing when the status received from the second adapter means indicates no data for predetermined time and at the end of each segment sending a memory erase command to the second adapter means when the number of requests equals or exceeds a predetermined number.

2. A data capture system as set forth in claim 1 in which the memory in the adapter is a non-volatile flash memory.

3. A data capture system as set forth in claim 1 in which the means for segmenting the received data for processing includes a timer which is restarted each time data is requested from the second adapter means and which is checked for expiration when the data present status from the second adapter means indicates no data during a data receiving operation.

4. A data capture system as set forth in claim 1 in which the means for sending a memory erase command to the second adapter means includes:

a counter which is incremented each time a data request is sent to the second adapter means; and, comparison means for comparing the value of the counter to a predetermined value N at predetermined times.

5. A data capture system as set forth in claim 4 in which the value N is greater than the largest expected segment of data where a segment includes one or more records and the segment is bounded by record boundaries.

6. A data capture system including a programmed computer, a bus and an adapter connected thereto for capturing data stored in another computer system when that system transmits data to a utilization device over a standard media interface comprising:

first adapter means for attaching the data capture system to the media and for selecting data on the media;

second adapter means responsive to said first adapter means for storing the selected data in ordered addresses in a memory, for providing a status signal to a utilization means in said computer for indicating the availability of data in the memory and for providing data stored in the memory via said bus to said utilization means in said computer upon request;

said utilization means comprising; means responsive to the status received from the second adapter means:

for requesting data when the status indicates data is available;

for counting the number of data requests issued;

for segmenting the received data for processing when the status received from the second adapter means indicates no data for a predetermined time;

for comparing the number of data requests to a predetermined number at the end of each segment; and, for sending a memory erase command to the second adapter means when the comparison indicates that the number of requests issued equals or exceeds the said predetermined number.

7. A data capture system as set forth in claim 6 in which the means for sending a memory erase command to the second adapter means includes:

a counter which is incremented each time a data request is sent to the second adapter means; and, comparison means for comparing the value of the counter to a predetermined value N at the segment boundaries.

8. A data capture system as se forth in claim 7 in which the value N is greater than the largest expected segment of data where a segment includes one or more records and the segment is bounded by record boundaries.

9. A data capture system as set forth in any one of claims 6, 7 or 8 in which the memory in the adapter is a non-volatile flash memory.

10. A data capture system as set forth in any one of claims 6, 7 or 8 in which the means for segmenting the received data for processing includes a timer which is restarted each time data is requested from the second adapter means and which is checked for expiration when the data present status from the second adapter means indicates no data during a data receiving operation.

* * * * *